Sept. 30, 1947.  V. O. BEAM ET AL  2,428,003
RESISTANCE BULB THERMOSTAT
Filed Nov. 3, 1943  2 Sheets-Sheet 1
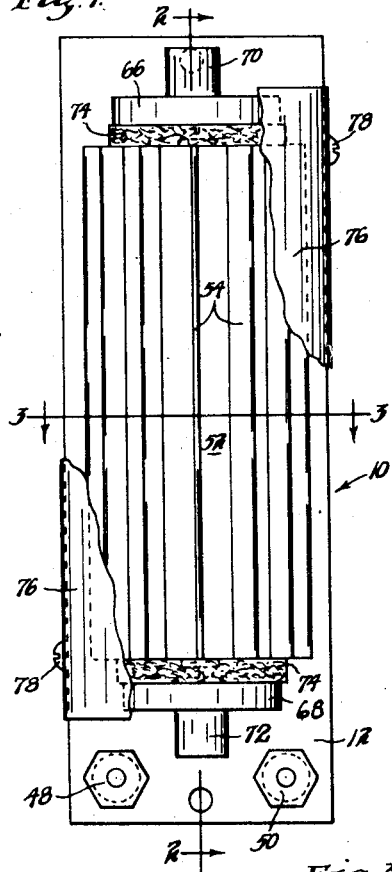
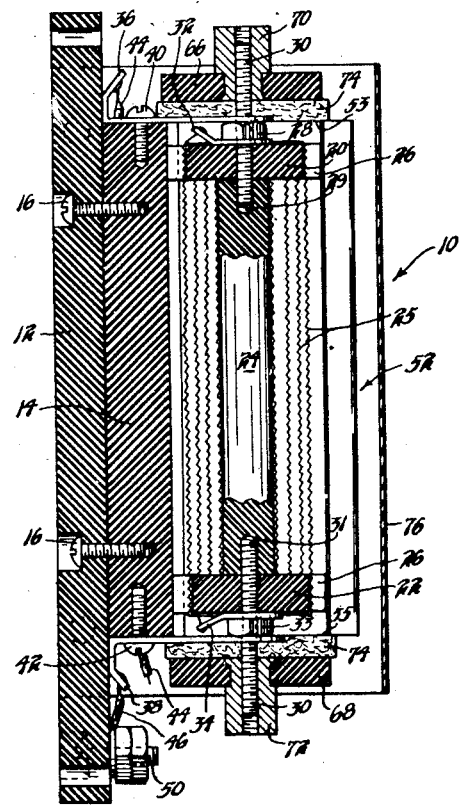
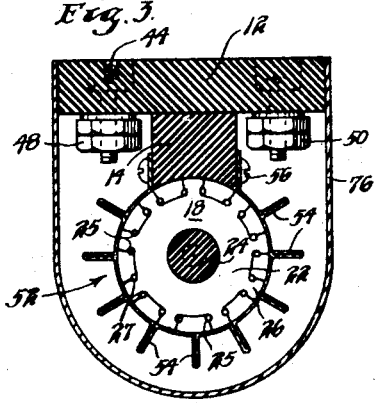
Inventors
VILYNN O. BEAM.
JOHN M. WILSON.
BENJAMIN CYR.
By George H. Fisher
Attorney

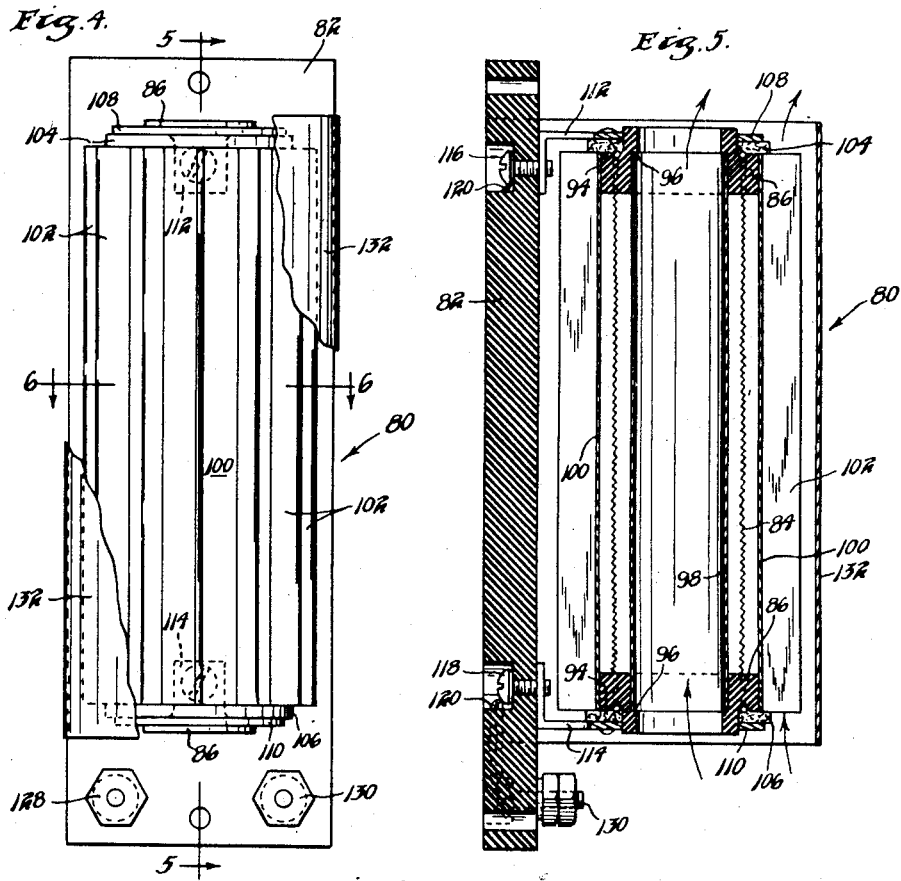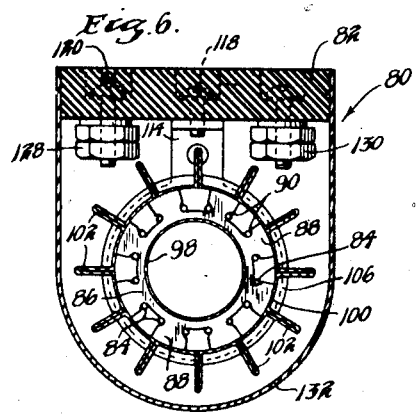

Patented Sept. 30, 1947

2,428,003

UNITED STATES PATENT OFFICE 2,428,003

RESISTANCE BULB THERMOSTAT

Vilynn O. Beam, John M. Wilson, and Benjamin Cyr, Minneapolis, Minn., assignors to Minneapolis-Honeywell Regulator Company, Minneapolis, Minn., a corporation of Delaware Application November 3, 1943, Serial No. 508,840

18 Claims. (Cl. 201—63)

1

This invention relates to a temperature responsive device of the resistance type and more particularly to a space resistance thermostat.

This invention further relates to a temperature responsive device generally, and more particularly to a device for varying an electrical quantity in accordance with temperature.

This invention utilizes in a resistance thermostat a relatively long resistance element of high temperature coefficient of resistance such as a fine wire which is open wound on different framework constructions and wherein a relatively high wattage is used, as compared to such a resistance unit for use with an ordinary direct current galvanometer type of instrument, so as to obtain high sensitivity. It is desired to have a considerable change in electrical characteristics or resistance upon a relatively small change in temperature and without any particular amount of lag, and to accomplish this, the relatively long resistance wire, the open winding and the relatively high wattage must be utilized. The difficulty, in employing such an instrument is that the occurrence of unusual drafts, as perhaps the opening of a door, a person walking close to the thermostat or some other abnormal transient condition, will cause a response of the thermostat which does not represent an average condition of the air in a room. So as to eliminate such abnormal air disturbances, it has been found necessary to provide means to protect the sensitive element from the effects of such transient and abnormal conditions without materally affecting its normal sensitivity. In the present invention, different enclosing arrangements are utilized to seal the resistance element from the air so that the response of the apparatus is not materially affected by a temporary change in the rate of air movement at or near the thermostat. That is, the element is so protected that it will give substantially the same response for a given temperature of air even though the rate of air movement near the thermostat is temporarily increased.

It is an object of this invention to construct an improved temperature responsive device of the type which includes an electrical resistance element having an appreciable temperature coefficient of resistance.

Another object of the present invention is to construct a novel housing arrangement for a temperature responsive device.

Another object of the invention is to provide a housing arrangement for a temperature responsive device having a large area thereof in heat transfer relationship with the air.

It is a still further object of this invention to provide a housing arrangement for the temperature responsive device for guiding air in heat transfer relationship with the temperature responsive device.

It is another object of this invention to provide a housing arrangement which flows air internally and externally of the resistance element of the temperature responsive device but prevents the air from contacting the resistance element itself.

It is another object of this invention to provide a relatively long resistance element of high temperature coefficient of resistance which is open wound. It is still another object of this invention to provide a sealed housing for the open wound resistance element to prevent direct contact of air with the resistance element.

It is possible to utilize a resistance element having different resistance values but it is more effective to use a resistance element having a resistance value of approximately 1500 ohms.

Figure 1 is a front elevational view of a temperature responsive device, parts being broken away.

Figure 2 is a vertical sectional view taken on line 2—2 of Figure 1.

Figure 3 is a sectional view taken on line 3—3 of Figure 1.

Figure 4 is a front elevational view of a modification of the temperature responsive device with parts broken away.

Figure 5 is a sectional view taken on line 5—5 of Figure 4.

Figure 6 is a sectional view taken on line 6—6 of Figure 4.

Referring to the drawings in detail, a resistance thermostat 10 is adapted to be mounted on an insulation terminal plate 12. The terminal plate 12 is secured by screw means 16 to an insulation block 14. There is provided a frame member 18 of insulation material comprising circular end members 20 and 22 which are axially connected together by a shaft 24. Each of the circular end members 20 and 22 have a plurality of spaced peripheral teeth 26. Each of these teeth 26 is notched on the opposite sides as shown at 27 so that a relatively long resistance wire 25 of high temperature coefficient of resistance can be mounted between the circular members 20 and 22, thereby providing a plurality of loops of resistance wire mounted on the frame member 18. The loops of resistance wire thus form a cylindrical-shaped resistance element which contacts the frame member 18 only at the teeth elements 26.

Similar screw threaded metal posts 30 are secured in apertures 29 and 31 at the opposite ends of the carriage member 18. Conductor arms 32 and 34 are mounted on the metal posts 30 and are held in fixed position at the opposite ends of the frame member 18 by nuts 28 and 33 mounted on the posts 30. These conductor arms 32 and 34 are respectively soldered or otherwise connected to the opposite ends of the resistance wire 25. Conductor bars 36 and 38 are mounted on the posts 30 adjacent the nuts 28 and 33 respectively, and extend to the opposite ends of insulation block 14 where they are secured by screw means 40 and 42. Conductors 44 and 46 are soldered or otherwise connected to conductor bars 36 and 38, respectively, and extend to and are connected to terminal posts 48 and 50.

A metal shield 52 having a plurality of fins 54 formed integrally therewith surrounds the frame 18 carrying the fine spirally wound resistance wire element 25. The shield 52 is secured to the insulation block 14 by screws 56. The inside of the shield 52 is blackened for absorbing heat radiation from resistance wire 25. The shield 52 is open at its opposed ends and its opposed ends 53 and 55 extend beyond the ends of the frame 18. There are circular insulation plugs 66 and 68 each comprising an integral nut 70 and 72 spaced at the opposite ends of the shield 52. An insulation packing ring 74 is secured to the inside of each of the plugs 66 and 68. The plug members 66 and 68 are screwed on the threaded posts 30 in abutting relationship with the opposite open ends of the shield 52. When the plugs 66 and 68 are spaced in abutting relationship at the opposite ends of the shield 52, the resistance element 25 is completely enclosed so that air cannot contact the resistance element. A metal U-shaped housing 76 is mounted over the shield member 52 and is secured to the terminal plate 12 by screws 78. The U-shaped housing 76 is spaced from the shield 52 and is adapted to guide a flow of air over the shield 52.

In the form of resistance thermostat shown in Figures 1, 2, and 3 the resistance element 25 is completely enclosed in the metal shield 52, and the air flows into the housing 76 and in heat transfer relationship with the metal shield 52. The air in its heat transfer relationship with the metal shield 52 contacts the fins 54 thereof. In such a construction the temperature responsive device effectively measures the temperature of the air, and does not measure the flow of the air. The resistance element is therefore responsive only to the temperature of the air. Terminal plate 12 of the temperature responsive device is to be secured to a wall support (not shown).

Figures 4, 5 and 6 disclose a modified temperature responsive device 80. The resistance bulb thermostat 80 is provided with a base or terminal plate 82 of insulation material which is adapted to be fastened to a wall (not shown). The resistance element 84 is a fine spirally wound wire of a high temperature coefficient of resistance.

Supported on terminal plate 82 by a pair of opposing brackets 112 and 114 are a pair of ring members 86 formed of insulation material. Each of ring members 86 is provided on its periphery with a plurality of outwardly extending teeth 88, each of which has a pair of notches 90 on its opposed sides. The spirally wound resistance element 84 is mounted in the notches 90 of teeth 88 and extends between the opposed rings 86 to form a plurality of substantially continuous loops in the general shape of a cylinder.

Each of ring members 86 is provided with an outer or circumferential shoulder 94, and an internal or inner circular shoulder 96. A metal cylinder 98 which is open on both ends, is attached to the inner shoulders 96 of rings 86 so as to space the rings apart. A larger metal cylinder housing or shield 100, which is provided with a plurality of radial fins 102 on its outer surface, is attached to the outer shoulder 94, with its opposite ends in abutting relation with the outer edges of teeth 88. A pair of washers 104 and 106, formed of insulating material are located on the outer surfaces of shoulders 94. Located on the exterior of the insulating washers, are a pair of metal washers 108 and 110 from which brackets 112 and 114 extend. The opposite ends of resistance element 84 are joined to washer 108 and 110 for conveying current through brackets 112 and 114, and screws 116 and 118, to base plate 82. Conductors 120, extend from screws 116 and 118 to terminal posts 128 and 130 respectively, which are in turn adapted to be connected to a control circuit (not shown).

A U-shaped housing 132 which may also be formed of metal is spaced from the shield member 100 and is secured by screws (not shown) to terminal plate 82.

The cylindrical member 98 provides for an internal flow of air in heat transfer relation with the temperature responsive device 80, while the housing 132 provides an external passageway for the flow of air in heat transfer relationship with the temperature responsive device. This construction provides a device completely sealed from the air but at the same time it is highly responsive to the temperature of the air in a space.

As various changes and modifications of this invention may occur to those who are skilled in the art, we wish it to be understood that we intend to be limited only by the scope of the appended claims and not by the specific embodiment disclosed herein.

We claim as our invention:

1. A space thermostat for use with temperature control apparatus, which comprises, a frame member, a temperature responsive resistance element having a high temperature coefficient of resistance wound on the outer periphery of said frame member, sealing means enclosing both said element and said frame member in such a manner as to exclude said element from contact with transient air, and means for guiding transient air into contact with the exterior of said sealing means.

2. A space thermostat for use with temperature control apparatus which comprises, a base, a frame member mounted on said base, a temperature responsive resistance element having a high coefficient of resistance longitudinally wound on the exterior of said frame member, a shield member having a plurality of fin portions extending from its periphery, said shield member completely enclosing both said element and said frame member in such a manner as to exclude said element from contact with transient air, and means for guiding transient air into contact with the fin portions of said shield.

3. A space thermostat for use with temperature control apparatus, which comprises, a single temperature responsive resistance element having a high temperature coefficient of resistance, a shield member completely sealing said element from direct contact with transient atmosphere, and a plurality of fins extending from the outer periphery of said shield member in such a manner that said shield assumes the temperature of ambient atmosphere.

4. A space thermostat for use with temperature control apparatus, which comprises, a frame member, a temperature responsive resistance element having a high temperature coefficient of resistance mounted on said frame member, a shield completely enclosing both said element and said frame in such a manner as to exclude said element from direct contact with transient air, and housing means spaced from said shield, said housing means having open ends thereby forming a passageway surrounding said shield for guiding air in heat transfer relationship with said shield.

5. A space thermostat for use with temperature control apparatus, which comprises, a frame member having at least two spaced apart elements, a temperature responsive resistance element having a high temperature coefficient of resistance mounted on said frame member and extending in substantially exposed condition between said spaced apart elements, a shield member completely enclosing both said element and said frame member in such a manner as to exclude said element from direct contact with ambient atmosphere, and a housing member spaced from said shield, said member having open ends thereby forming a passageway between the housing and the shield for the movement of ambient air in heat transfer relationship with said shield.

6. In a temperature responsive device comprising a resistance element of a high temperature coefficient of resistance, a frame member for mounting the resistance element, a shield means having a plurality of radial fins extending from its outer side completely enclosing the resistance element, and a housing member having open ends spaced from the shield means thereby forming a passageway between the housing and the shield for guiding air in heat transfer relationship with the shield means.

7. In a temperature responsive device comprising a resistance element of a high temperature coefficient of resistance, a frame member comprising at least two spaced apart disks for mounting the resistance element into a cylinder shaped unit, a shield member sealing the resistance element from atmosphere, a housing member having open ends spaced from the shield member thereby forming a passageway between the housing and shield for guiding the air in heat transfer relationship with the shield, and means supporting the temperature responsive device.

8. In a temperature responsive device comprising a resistance element of a high temperature coefficient of resistance, a frame member carrying the resistance element thereon, a cylindrical metal shield member surrounding the frame, a plug member at each end of the cylindrical shield for sealing the resistance element from atmosphere, a U-shaped housing member spaced around the shield member forming a passageway between the shield and housing for the flow of air about the shield, and means for supporting the temperature responsive device.

9. In a temperature responsive device comprising a resistance element having only a high temperature coefficient of resistance, a frame member carrying the resistance thereon, a shield having a plurality of peripheral fins on the outside surrounding the frame carrying the resistance element, and a plug member at each end of the shield for preventing air to contact the resistance element.

10. In a space thermostat, a frame member having a tubular center portion, a temperature responsive resistance element mounted on the outer surface of said frame member, sealing means completely enclosing both said element and the outer surface of said frame member in such a manner as to exclude said element from direct contact with transient air, and means for guiding transient air in heat transfer relationship with the exterior of said sealing means and through the tubular portion of said frame member in such a manner that said temperature responsive element gradually assumes the temperature of ambient air.

11. In a temperature responsive device comprising a resistance element having a high temperature coefficient of resistance, a frame member carrying the resistance element, a shield sealing the resistance element from atmosphere and having an internal passageway for the flow of air through the shield, and a housing member spaced from the shield thereby forming a passageway between the shield and said housing for guiding air in heat transfer relationship with the shield.

12. In a temperature responsive device comprising a resistance element of a high temperature coefficient of resistance, a frame member carrying the resistance element, a metal shield sealing the resistance element from atmosphere and having an internal passageway for the flow of air to contact the shield, a housing member spaced from the shield forming a passageway between the shield and the housing, and a base means for supporting the temperature responsive device.

13. In a temperature responsive device comprising a resistance element of a high temperature coefficient of resistance, a frame member carrying the resistance element, shield means surrounding the resistance element and having an internal passageway for the flow of air to contact the shield, the shield means having a plurality of fins, a housing member spaced from the shield means forming a passageway between the shield and said housing for a flow of air to contact the shield and its fins, and means for supporting the temperature responsive device.

14. A space thermostat for use with temperature control apparatus, which comprises, a frame member, a temperature responsive resistance element mounted on said frame member, shield means for sealing said element from direct contact with atmosphere comprising an inner cylindrical portion forming a central passage through the frame member and an outer cylindrical portion which encloses both the element and the peripheral surface of the frame member, and a housing member spaced from the outer cylindrical portion forming a passage for air between the shield and the housing whereby the shield may assume the temperature of the atmosphere.

15. A space thermostat for use with temperature control apparatus, which comprises, a frame member having two spaced apart elements, a temperature responsive resistance element extending between said spaced apart elements, a shield member completely surrounding both the resistance element and the frame member to exclude the temperature responsive element from contact with transient air, said shield member including an inner tubular portion and an outer tubular portion, and a housing member spaced from the outer portion of said shield forming a passage for air between said housing and said shield.

16. A space thermostat for use with temperature control apparatus, which comprises, a base member adapted for wall mounting, a frame member supported on said base and having two spaced apart elements, a temperature responsive resistance element extending between said spaced apart elements in a substantially continuous manner, a protective member supported by said base member completely surrounding said temperature responsive element to exclude the same from contact with transient atmospheric currents, said member including an inner tubular portion and an outer portion, the latter portion carrying a plurality of radially arranged fins on its external surface, and a housing member supported by said base in spaced relation with said protecting member forming a passage for air in heat transfer relationship with said protecting member.

17. In a temperature responsive control device comprising a temperature responsive resistance element of finely wound spiral wire, a frame member comprising at least two spaced apart elements, the frame member carrying the resistance element in a series of loops forming a cylindrical shaped resistance element, a shield member enclosing the resistance element comprising a hollow inner portion forming a passage for a flow of air in heat transfer relationship with the shield and an outer portion having a plurality of flanges on its outer surface, and a housing member spaced from the outer portion of the shield forming a passage for air between the outer portion of the shield member and the housing whereby the shield assumes the temperature of the ambient air flowing thereover.

18. In a temperature responsive control device comprising a temperature responsive resistance element of fine spirally wound wire, a frame member comprising at least two spaced apart elements, said frame member carrying the resistance element in a series of loops forming a cylindrical shaped resistance element, a shield member enclosing the resistance element comprising a hollow inner portion forming a passage for the flow of air in heat transfer relationship with the shield and an outer portion having a plurality of fins on its outer surface, a support means for the temperature responsive device, means spacing the shield member from the support, and a housing member secured to the support and being spaced from the outer portion of the shield thereby forming a passage for the flow of air over substantially the entire outer surface of the shield member whereby the shield assumes the temperature of ambient air flowing thereover.

VILYNN O. BEAM.
JOHN M. WILSON.
BENJAMIN CYR.

REFERENCES CITED

The following references are of record in the file of this patent:

UNITED STATES PATENTS

| Number | Name | Date |
| --- | --- | --- |
| 1,218,205 | Packard | Mar. 6, 1917 |
| 1,879,889 | Ballentine | Sept. 27, 1932 |
| 2,057,945 | Gastrow | Oct. 20, 1936 |
| 1,754,232 | Fisher | Apr. 15, 1930 |
| 2,098,650 | Stein | Nov. 9, 1937 |
| 2,154,862 | Olshevsky | Apr. 18, 1939 |
| 2,027,277 | Habann | Jan. 7, 1936 |
| 2,170,193 | Godsey, Jr. | Aug. 22, 1939 |
| 960,823 | Clark | June 7, 1910 |
| 1,646,845 | Wright | Oct. 25, 1927 |

FOREIGN PATENTS

| Number | Country | Date |
| --- | --- | --- |
| 503,214 | France | Mar. 11, 1920 |
| 417,665 | Great Britain | Apr. 7, 1933 |